US010871964B2

(12) United States Patent
Turakhia et al.

(10) Patent No.: US 10,871,964 B2
(45) Date of Patent: Dec. 22, 2020

(54) ARCHITECTURE FOR SPARSE NEURAL NETWORK ACCELERATION

(71) Applicant: QUALCOMM Incorporated, San Diego, CA (US)

(72) Inventors: Yatish Girish Turakhia, Stanford, CA (US); Javid Jaffari, San Diego, CA (US); Amrit Panda, San Diego, CA (US); Karamvir Chatha, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 953 days.

(21) Appl. No.: 15/393,670

(22) Filed: Dec. 29, 2016

(65) Prior Publication Data

US 2018/0189056 A1 Jul. 5, 2018

(51) Int. Cl.
*G06F 9/30* (2018.01)
*G06N 3/063* (2006.01)
*G06N 3/04* (2006.01)

(52) U.S. Cl.
CPC ........... *G06F 9/3001* (2013.01); *G06N 3/063* (2013.01); *G06N 3/0454* (2013.01)

(58) Field of Classification Search
CPC ..... G06F 9/3001; G06N 3/063; G06N 3/0454
See application file for complete search history.

(56) References Cited

U.S. PATENT DOCUMENTS

| 5,206,822 | A | 4/1993 | Taylor |
| 9,311,558 | B2 | 4/2016 | Collet et al. |
| 9,367,519 | B2 | 6/2016 | Strauss et al. |
| 2016/0358068 | A1* | 12/2016 | Brothers ............... G06N 3/0454 |
| 2017/0192793 | A1* | 7/2017 | Chilimbi ............. G06F 9/30021 |

FOREIGN PATENT DOCUMENTS

EP 3035204 A1 6/2016

OTHER PUBLICATIONS

Judd, et al., "Sripes: Bit-Serial Deep Neural Network Computing", 9th Annual IEEE/ACM International Symposium on Microarchitecture (MICRO), Oct. 15-19, 2016 (Year: 2016).*
Liu W., et al., "An Efficient GPU General Sparse Matrix-Matrix Multiplication for Irregular Data", IEEE 28th International Parallel & Distributed Processing Symposium, 2014, pp. 370-381.
Nurvitadhi E., et al., "Hardware Accelerator for Analytics of Sparse Data", Design, Automation & Test in Europe Conference& Exhibition (DATE), 2016, pp. 1616-1621.

(Continued)

*Primary Examiner* — Robert A Cassity
*Assistant Examiner* — Tsu-Chang Lee
(74) *Attorney, Agent, or Firm* — Holland & Hart LLP-CLX

(57) ABSTRACT

A method, a computer-readable medium, and an apparatus for a sparse neural network are provided. The apparatus may include a hardware accelerator. The apparatus may determine, for each pair of operands to be processed by a MAR unit, whether both operands of the pair are non-zero. The apparatus may prevent a pair of operands to be processed by the MAR unit from being loaded to a multiplier of the MAR unit when an operand of the pair of operands is zero. The apparatus may place the pair of operands into one of a plurality of queues when both operands of the pair of operands are non-zero.

30 Claims, 10 Drawing Sheets

(56) References Cited

OTHER PUBLICATIONS

Alberico J., et al., "Bit-Pragmatic Deep Neural Network Computing", Proceedings of the 50th Annual IEEE/ACM International Symposium on Microarchitecture, MICRO-50'17, Oct. 20, 2016, pp. 382-394, XP055450862, New York, New York, USA, DOI: 10.1145/3123939.3123982, ISBN: 978-1-4503-4952-9.

Han S., et al., "EIE: Efficient Inference Engine on Compressed Deep Neural Network", ACM SIGARCH Computer Architecture News, vol. 44, No. 3, May 3, 2016 (May 3, 2016), pp. 243-254, XP055449317.

International Search Report and Written Opinion—PCT/US2017/062367—ISA/EPO—Feb. 22, 2018.

Judd P., et al., "Stripes: Bit-Serial Deep Neural Network Computing", 2016 49th Annual IEEE/ACM International Symposium on Microarchitecture (Micro), IEEE, Oct. 15, 2016, pp. 1-12, XP033022465, DOI: 10.1109/MICR0.2016.7783722 [retrieved on Dec. 14, 2016].

\* cited by examiner

ARCHITECTURE FOR SPARSE NEURAL NETWORK ACCELERATION

BACKGROUND

Field

The present disclosure relates generally to computing systems for artificial neural networks, and more particularly, to hardware accelerators for deep neural networks.

Background

An artificial neural network, which may include an interconnected group of artificial neurons, may be a computational device or may represent a method to be performed by a computational device. Artificial neural networks may have corresponding structure and/or function in biological neural networks. However, artificial neural networks may provide useful computational techniques for certain applications in which traditional computational techniques may be cumbersome, impractical, or inadequate. Because artificial neural networks may infer a function from observations, such networks may be useful in applications where the complexity of the task or data makes the design of the function by conventional techniques burdensome.

In computing, hardware acceleration is the use of computer hardware to perform some functions more efficiently than is possible in software running on a more general-purpose CPU. The hardware that performs the acceleration may be referred to as a hardware accelerator. Hardware accelerators may improve the execution of a specific algorithm by allowing greater concurrency, having specific datapaths for temporaries in the algorithm, and possibly reducing the overhead of instruction control.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep convolution neural networks (DCNs) have shown great performance in classification problems (e.g. image recognition). Dedicated hardware accelerators may be built to enable various applications of DCN technology in areas like mobile computing and cloud computing. Power-intensive operations in DCNs may be matrix-matrix multiplication and convolution.

Several technologies may reduce the computational overhead and improve the quality of the DCN classifiers. However, such technologies may lead to increased sparsity of the multiplication operands (e.g., higher percentage of zero-valued operands because of the reduced number of non-zero operands). For example, weight pruning may lead to around 30-70% sparsity in a DCN. The use of rectified linear unit (ReLU) activation may cause around 50% sparsity in a DCN. Dropouts of DCNs (for training only) may lead to 25-75% sparsity in the DCNs. A neural network with high percentage of zero-valued operands may be referred to as a sparse neural network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Several technologies may reduce the computational overhead and improve the quality of the DCN classifiers. However, such technologies may lead to increased sparsity of the multiplication operands. A hardware accelerator design may take sparsity into account to maximize computation units utilization. For example, a hardware accelerator may be configured to avoid multiplying by zero-valued operands in a multiply-accumulate-reduce (MAR) unit.

In an aspect of the disclosure, a method, a computer-readable medium, and an apparatus for a neural network are provided. The apparatus may include a hardware accelerator. The apparatus may determine, for each pair of operands to be processed by a MAR unit, whether both operands of the pair are non-zero. The apparatus may prevent a pair of operands to be processed by the MAR unit from being loaded to a multiplier of the MAR unit when an operand of the pair of operands is zero. The apparatus may place the pair of operands into one of a plurality of queues when both operands of the pair of operands are non-zero.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
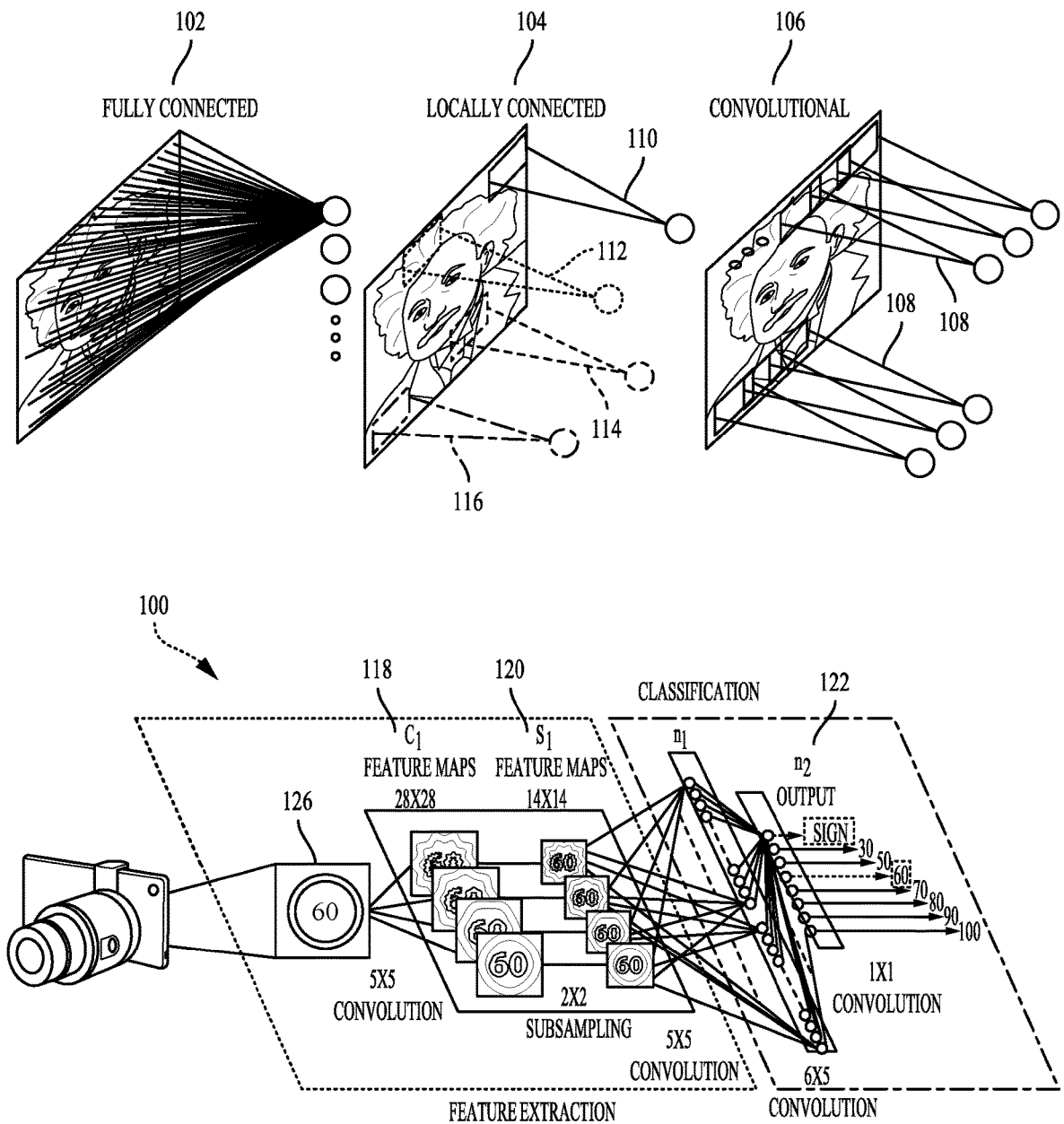
FIG. 1 is a diagram illustrating a neural network in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computing systems for artificial neural networks will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

An artificial neural network may be defined by three types of parameters: 1) the interconnection pattern between the different layers of neurons; 2) the learning process for updating the weights of the interconnections; 3) the activation function that converts a neuron's weighted input to its output activation. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

FIG. 1 is a diagram illustrating a neural network in accordance with aspects of the present disclosure. As shown in FIG. 1, the connections between layers of a neural network may be fully connected 102 or locally connected 104. In a fully connected network 102, a neuron in a first layer may communicate its output to every neuron in a second layer, so that each neuron in the second layer will receive input from every neuron in the first layer. Alternatively, in a locally connected network 104, a neuron in a first layer may be connected to a limited number of neurons in the second layer. A convolutional network 106 may be locally connected, and is further configured such that the connection strengths associated with the inputs for each neuron in the second layer are shared (e.g., 108). More generally, a locally connected layer of a network may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 100 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 126, and a "forward pass" may then be computed to produce an output 122. The output 122 may be a vector of values corresponding to features such as "sign," "60," and "100." The network designer may want the DCN to output a high score for some of the neurons in the output feature vector, for example the ones corresponding to "sign" and "60" as shown in the output 122 for a network 100 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 126 and a forward pass through the network may yield an output 122 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 118 and 120, with each element of the feature map (e.g., 120) receiving input from a range of neurons in the previous layer (e.g., 118) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 2:
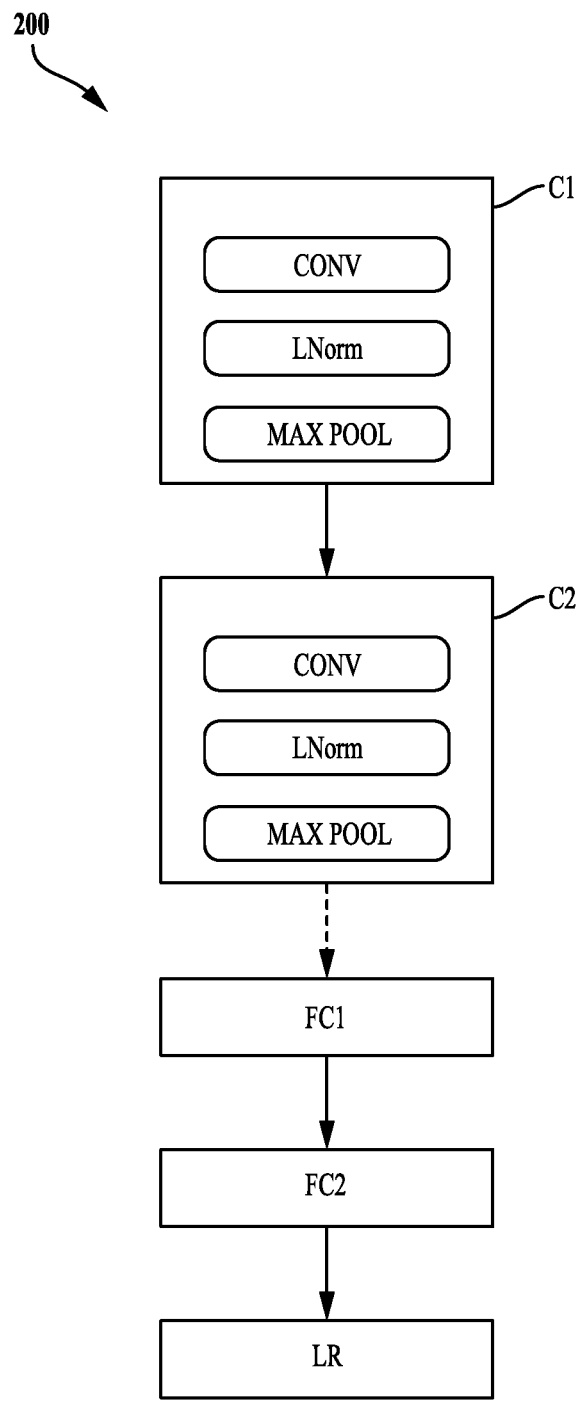
FIG. 2 is a block diagram illustrating an exemplary deep convolutional network (DCN) in accordance with aspects of the present disclosure.

FIG. 2 is a block diagram illustrating an exemplary deep convolutional network 200. The deep convolutional network 200 may include multiple different types of layers based on connectivity and weight sharing. As shown in FIG. 2, the exemplary deep convolutional network 200 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 200 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU or GPU of an SOC, optionally based on an Advanced RISC Machine (ARM) instruction set, to achieve high performance and low power consumption. In alternative embodiments, the parallel filter banks may be loaded on the DSP or an image signal processor (ISP) of an SOC. In addition, the DCN may access other processing blocks that may be present on the SOC, such as processing blocks dedicated to sensors and navigation.

The deep convolutional network 200 may also include one or more fully connected layers (e.g., FC1 and FC2). The deep convolutional network 200 may further include a logistic regression (LR) layer. Between each layer of the deep convolutional network 200 are weights (not shown) that are to be updated. The output of each layer may serve as an input of a succeeding layer in the deep convolutional network 200 to learn hierarchical feature representations from input data (e.g., images, audio, video, sensor data and/or other input data) supplied at the first convolution block C1.

The network 100 or the deep convolutional network 200 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The network 100 or the deep convolutional network 200 may be utilized in a large range of applications, such as image and pattern recognition, machine learning, motor control, and the like. Each neuron in the neural network 100 or the deep convolutional network 200 may be implemented as a neuron circuit.

In certain aspects, the network 100 or the deep convolutional network 200 may be configured to improve computation efficiency by taking sparsity of weights and activations in the neural network into consideration. For example, the network 100 or the deep convolutional network 200 may be configured to avoid multiplying by zero-valued operands in a MAR unit, as will be described below with reference to FIGS. 3-10.

Figure 3:
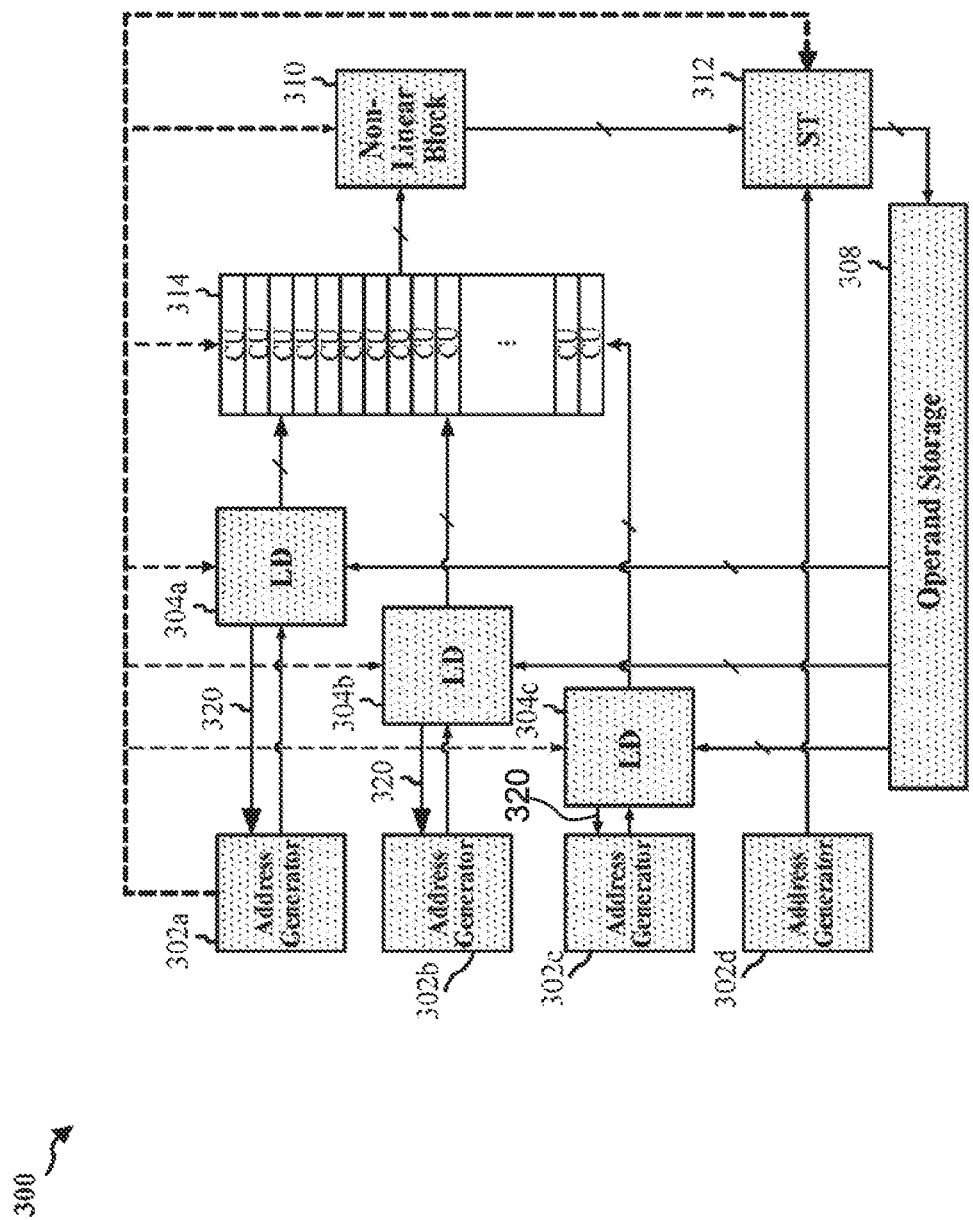
FIG. 3 is a diagram illustrating an example of a device for a sparse neural network.

FIG. 3 is a diagram illustrating an example of a device 300 for a sparse neural network. The device 300 may be any computing device. In one configuration, the device 300 may include a hardware accelerator that is configured to avoid multiplying by zero-valued operands in a multiply-accumulate-reduce (MAR) unit. As illustrated in FIG. 3, the device 300 may include one or more address generators 302, one or more load units 304, one or more computation units 314, a non-linear block 310, and a store unit 312.

Each of the computation units 314 may include a MAR unit that has multiple multipliers followed by an adder. Each multiplier of the MAR unit may compute the product of two operands. The adder of the MAR unit may compute the sum of the products from all multipliers of the MAR unit. In one configuration, the computation units 314 may perform computation/calculation for the neural network. In one configuration, each multiplier and the adder of the MAR unit may be implemented in combinational logic. The details of a computation unit 314 will be described below in more details with reference to FIG. 4.

The device 300 may include an operand storage 308. The operand storage 308 may be a memory or a cache for storing operands that are to be loaded to the multipliers of the computation units 314. In one configuration, for each pair of operands, the first operand may be a weight of the neural network, and the second operand may be an activation of the neural network.

The load units 304 may be configured to load operands from the operand storage 308 to the computation units 314. Specifically, a load unit (e.g., 304a, 304b, or 304c) may load pairs of operands from the operand storage 308 to multipliers within a computation unit 314. In one configuration, a load unit (e.g., 304a, 304b, or 304c) may send a synchronization signal 320 to an address generator (e.g., 302a, 302b, or 302c, respectively).

The non-linear block 310 may be configured to receive an output of a computation unit 314 and perform a non-linear operation on the output of the computation unit 314. The non-linear operation may be an operation of which the output is not directly proportional to the input. In one configuration, the non-linear block 310 may be a rectified linear unit (ReLU). In one configuration, the non-linear block 310 may perform at least a portion of an activation function for a neuron of the neural network.

The store unit 312 may receive the output of the non-linear block 310 and store the output of the non-linear block 310 into the operand storage 308. In one configuration, the output of the non-linear block 310 may include an updated activation for the neural network.

The address generators 302 may be configured to generate addresses for accessing the operand storage 308. In one configuration, an address generator (e.g., 302a) may generate the addresses for a pair of operands that are to be loaded to a multiplier within a computation unit 314, and send the addresses to a load unit (e.g., 304a), which may load the pair of operands from the operand storage 308 based on the addresses. In one configuration, an address generator (e.g., 302d) may generate the address for an output of the non-linear block 310, and send the address to the store unit 312, which may store the output of the non-linear block 310 to the operand storage 308 based on the address.

In one configuration, a load unit (e.g., 304a) may fetch several pairs of operands (e.g., 4 pairs of operands) from the operand storage 308 and determine, for each fetched pair of operands, whether both operands of the operand pair are non-zero. If both operands of an operand pair are non-zero, the load unit may load the pair of operands to a multiplier of a MAR unit in one of the computation unit 314. Otherwise, if at least one operand of the operand pair is zero, the load unit may prevent the operand pair from being loaded to any multiplier in the computation unit 314. The details of the load unit (e.g., 304a) will be described below in more details with reference to FIG. 5 or FIG. 7.

The device 300 may increase utilization of MAR units by fetching more operands for each MAR instruction and performing computation when needed (e.g., when both operands are non-zero). In one configuration, the device 300 may perform scheduling and synchronization (e.g., using queue occupancy) in hardware. In one configuration, the device 300 may maintain a single instruction, multiple data (SIMD) architecture but perform variable cycle MAR instructions.

Figure 4:
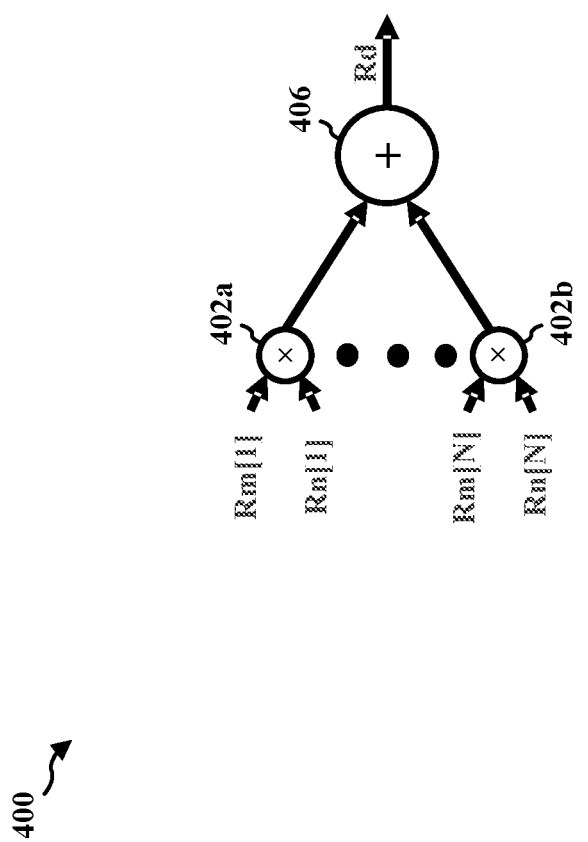
FIG. 4 is a diagram illustrating an example of a multiply-accumulate-reduce unit.

FIG. 4 is a diagram illustrating an example of a multiply-accumulate-reduce unit 400. In one configuration, the MAR unit 400 may be in a computation unit 314 described above with reference to FIG. 3. The MAR unit 400 may include several (e.g., N) multipliers 402a-402b and an adder 406. Each of the multipliers may take a pair of operands as inputs. For example, the multiplier 402a may take operands $R_m[1]$ and $R_n[1]$ as inputs, and the multiplier 402b may take operands $R_m[N]$ and $R_n[N]$ as inputs. In one configuration, the MAR unit 400 may include N number of multipliers. In one configuration, $R_m[1], \ldots, R_m[N]$ may be N dimensions of the vector $R_m$, and $R_n[1], \ldots, R_n[N]$ may be N dimensions of the vector $R_n$.

Each of the multipliers may compute the product of two input operands, and output the product to the adder 406. The adder 406 may take the outputs of all the multipliers 402a-402b as inputs and compute a summation of all the inputs to generate an accumulated value $R_d$ as the output of the MAR unit 400.

Figure 5:
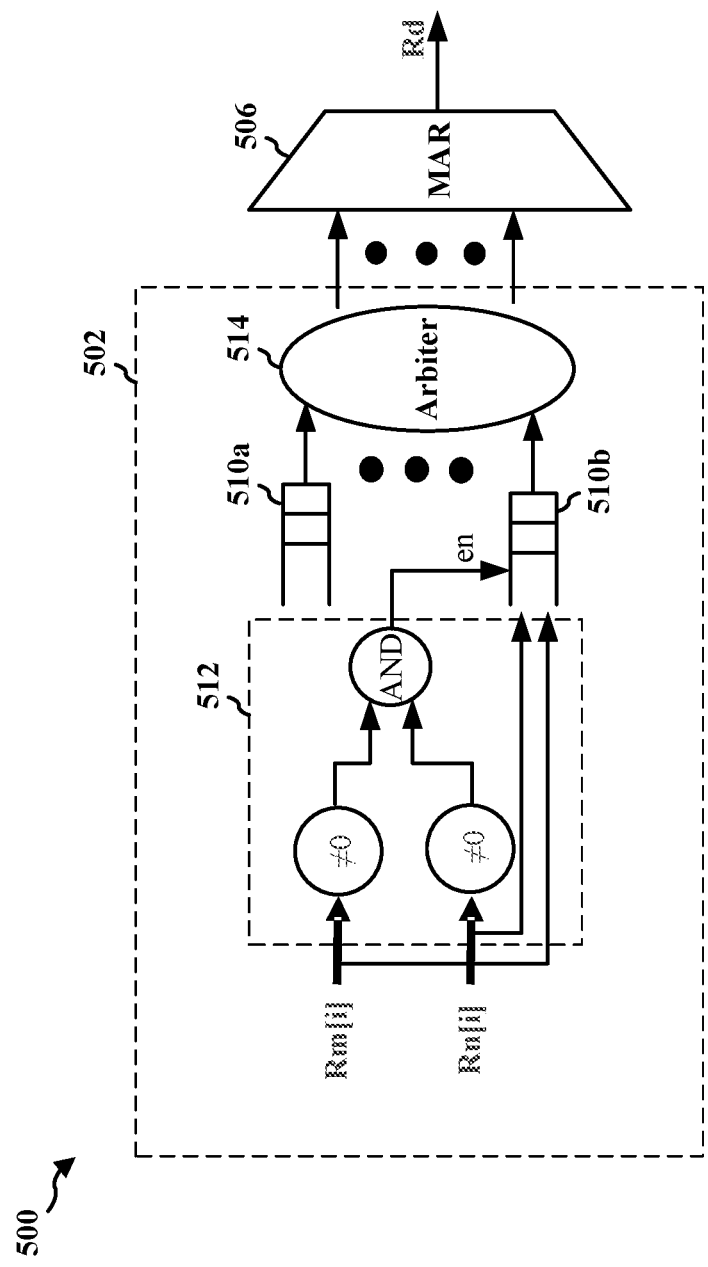
FIG. 5 is a diagram illustrating an example of a load unit that provides operands to a MAR unit.

FIG. 5 is a diagram 500 illustrating an example of a load unit 502 that provides operands to a MAR unit 506. In one configuration, the MAR unit 506 may be the MAR unit 400 described above with reference to FIG. 4, and the load unit 502 may be the load unit (e.g., 304a) described above with reference to FIG. 3. As illustrated, the load unit 502 may include a logic circuit 512, a plurality of queues 510 (e.g., 4 queues), and an arbiter 514.

The logic circuit 512 may receive a pair of operands $R_m[i]$ and $R_n[i]$, and determine whether both $R_m[i]$ and $R_n[i]$ are non-zero. If both $R_m[i]$ and $R_n[i]$ are non-zero, a queue (e.g., 510b) may be enabled to allow $R_m[i]$ and $R_n[i]$ to be placed into the queue. If at least one of $R_m[i]$ and $R_n[i]$ is zero, the plurality of queues 510 may be disabled, thus preventing $R_m[i]$ and $R_n[i]$ from being placed into any of the plurality of queues 510.

Each of the plurality of queues 510 may be first-in, first-out (FIFO). In one configuration, each non-zero operand pair may be placed into one of the plurality of queues 510 randomly. In one configuration, each non-zero operand pair may be placed into one of the plurality of queues 510 in a pre-determined order that repeats. For example, the first non-zero operand pair may be placed into the first queue, the second non-zero operand pair may be placed into the second queue, the third non-zero operand pair may be placed into the third queue, the fourth non-zero operand pair may be placed into the fourth queue. Assuming there are four queues, the pattern then repeats and the fifth non-zero operand pair may be placed into the first queue.

The arbiter 514 may select a pair of operands from one of the plurality of queues 510 and load the pair of operands to one multiplier of the MAR unit 506. In one configuration, the arbiter 514 may randomly select a pair of operands from the plurality of queues 510 and load the pair of operands to a multiplier of the MAR unit 506 (randomly or accordingly to a pre-determined order). In one configuration, the arbiter 514 may be an allocator that employs a set of heuristic rules to select a pair of operands from the plurality of queues 510 and load the pair of operands to a multiplier of the MAR unit 506 (randomly or accordingly to a pre-determined order) for increased utilization of the multipliers of the MAR unit 506.

In one configuration, a neural network may have 50% sparsity in weights and 50% sparsity in activations. As a result, there may be one non-zero pair of operands for every four pairs of operands. In such a configuration, the load unit 502 may fetch four times the operands that the MAR unit 506 can handle for each MAR instruction, and schedule the non-zero pairs of operands on the MAR unit 506. In one configuration, the load unit 502 may fetch the operands at any rate, such as 2-time the operands that the MAR unit 506 can handle, 4-time the operands that the MAR unit 506 can handle, 8-time the operands that the MAR unit 506 can handle, depending on the trade-off between area overhead, existing sparsity, and the desired throughput speed-up.

In one configuration, the load unit 502 may synchronize the plurality of queues 510 every K number of MAR instructions. In one configuration, to synchronize the plurality of queues 510, the load unit 502 may prevent placing new non-zero operands into the plurality of queues 510 before each queue of the plurality of queues 510 is empty. In one configuration, K may be a pre-determined number. In another configuration, the number K may be dynamically adjusted. In one configuration, the number K may be adjusted based on the number of dimensions of the vector space and/or the number of queues 510 in the load unit 502. In one configuration, an additional synchronization instruction may be added to enable variable K. In one configuration, the depth of each queue of the plurality of queues 510 may be K. In one configuration, a larger K may cause higher load balancing for the MAR unit 506.

In one configuration, the number of queues 510 in the load unit 502 may be dependent on the sparsity of the neural network. For example, the number of queues 510 may be four if the neural network has 50% sparsity in weights and 50% sparsity in activations. The MAR unit 506 may achieve a four-time speedup due to the full utilization of the MAR unit 506 (by filtering out zero operands). In one configuration, for better load-balancing of matrix-vector multiply using sparse vectors, a single vector and multiple rows of a matrix may be distributed across MAR units. In such a configuration, the single vector may be shared across multiple MAR units. One of the operands for all the MAR units may be the same vector and the other operand may be a distinct row from the matrix. This is a characteristic of vector-matrix multiplication which enables sharing an operand. Since the vector is shared between all MAR units, all zeros arising from the vector are also shared by all MAR units. This results in better load balancing. Since one of the operands (the vector) is shared among all the MAR units, the fetch bandwidth may be reduced when compared to vector-vector multiplication where both operands of each MAR unit are distinct and therefore no sharing is possible. As a result, the fetch-width requirement for vector may also be reduced.

Figure 6:
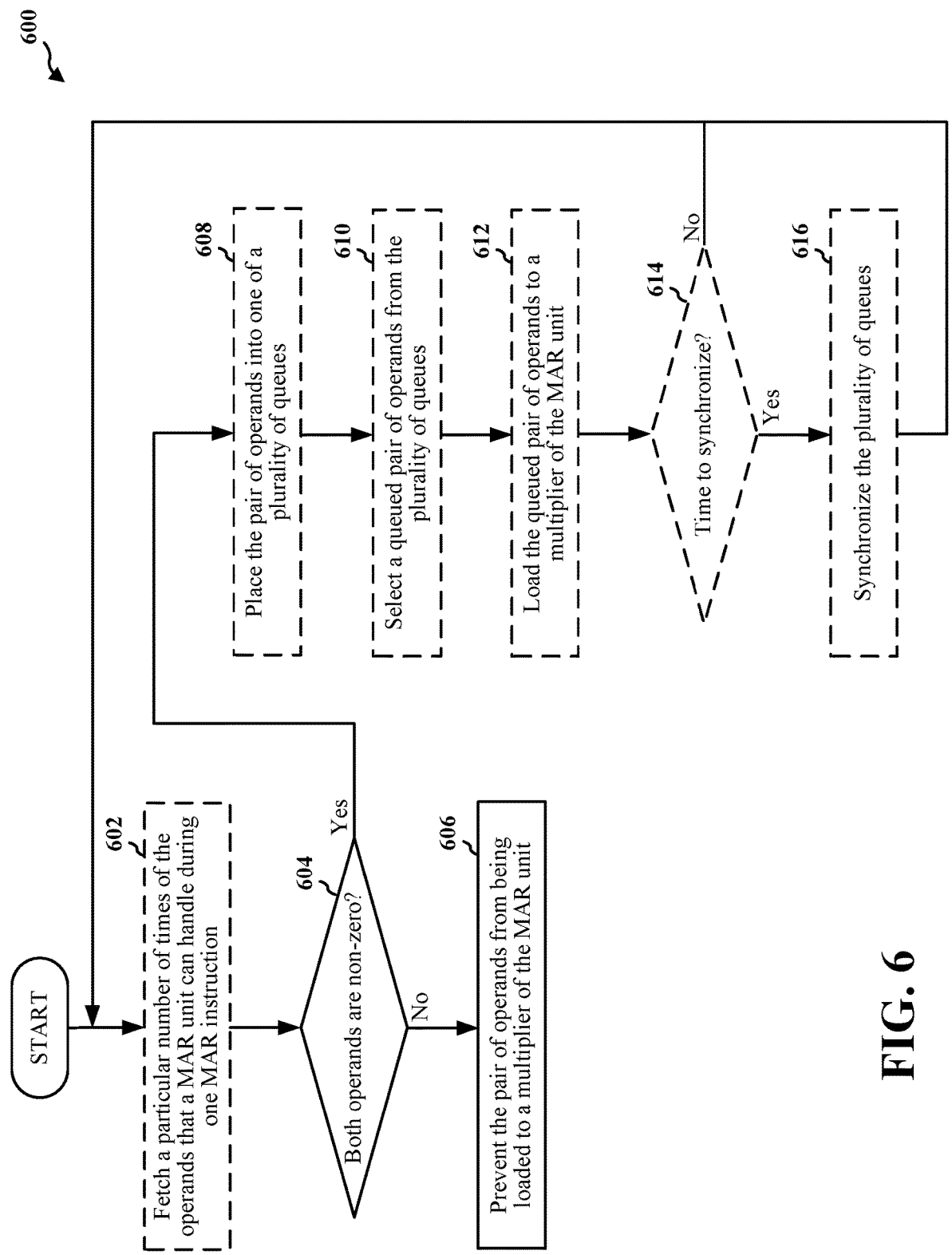
FIG. 6 is a flowchart of a method for a neural network.

FIG. 6 is a flowchart 600 of a method for a neural network. In one configuration, the neural network may be a deep convolutional neural network (DCN). The method may be performed by a computing device (e.g., the device 300 or the apparatus 902/902'). At 602, the device may optionally fetch a particular number (e.g., 4) of times the operands that a MAR unit can handle during one MAR instruction for the neural network. In one configuration, a weight and an activation of the neural network may form a pair of operands that are to be loaded to a multiplier (e.g., the multiplier 402a) of the MAR unit (e.g., the MAR unit 400 or 506, which may be within a computation unit 314). In one configuration, the weight and activation may be stored in an operand storage (e.g., the operand storage 308). In one configuration, the MAR unit may include a plurality of multipliers and an adder.

At 604, the device may determine, for each fetched operand pair, whether both operands of the pair are non-zero. If both operands of the fetched operand pair are non-zero, the device may proceed to 608. If at least one of the operands of the fetched operand pair is zero, the device may proceed to 606. In one configuration, the particular number (e.g., 4) pairs of operands may be determined (at 604) in parallel. In one configuration, in order to determine whether an operand (e.g., a weight or an activation) is zero or not, the operand may be compared to a zero value.

At 606, the device may prevent a pair of operands from being loaded to a multiplier of the MAR unit if at least one operand of the pair of operands is zero. In one configuration, to prevent the pair of operands from being loaded to a multiplier of the MAR unit, the device may prevent the pair of operands from being placed into one queue of a plurality of queues (e.g., 510).

At 608, the device may optionally place a pair of operands into one queue of a plurality of queues (e.g., 510) if both operands of the pair are non-zero. In one configuration, non-zero operand pairs may be placed into one queue of the plurality of queues randomly or in a pre-determined order that repeats. In one configuration, the total number of queues may be determined based on the sparsity of the neural network.

At 610, the device may optionally select a queued pair of operands from one queue of the plurality of queues. In one configuration, the device may select randomly from a queue that has queued pair of operands.

At 612, the device may optionally load the selected queued pair of operands to a multiplier of the MAR unit. In one configuration, an arbiter may randomly select a pair of operands from the plurality of queues and load the pair of operands to a multiplier of the MAR unit (e.g., randomly or according to a pre-determined sequence). In one configuration, an allocator may employ a set of heuristic rules to select a pair of operands from the plurality of queues, and to load the pair of operands to a multiplier of the MAR unit (e.g., randomly or according to a pre-determined sequence).

At 614, the device may optionally determine whether it is time to synchronize the plurality of queues. If it is time to synchronize, the device proceeds to 616. Otherwise, the device loops back to 602. In one configuration, the device may determine that it is time to synchronize the plurality of queues after a particular number of (e.g., K) MAR instructions. In one configuration, the particular number of MAR instructions may be a fixed number. In one configuration, the particular number of MAR instructions may be a variable number. In one configuration, the variable number of MAR instructions may be determined based on the size of the vector being processed by the MAR unit. For example, for dot-product of two vectors of size L, the synchronization may occur after ceiling(L/N) instructions (i.e., K=ceiling(L/N)), where N is the number of multipliers in the MAR unit. In convolution, the size of the vector may correspond to the volume of the kernel.

In one configuration, each queue of the plurality of queues may have a depth of the particular number. In one configuration, in order to synchronize the plurality of queues, the device may prevent placing new operands into the plurality of queues before all queues are empty.

At 616, the device may optionally synchronize the plurality of queues. In one configuration, during synchronization, new operands may be prevented from being placed into any queue until all queues are empty. The device may then loop back to 602.

Figure 7:
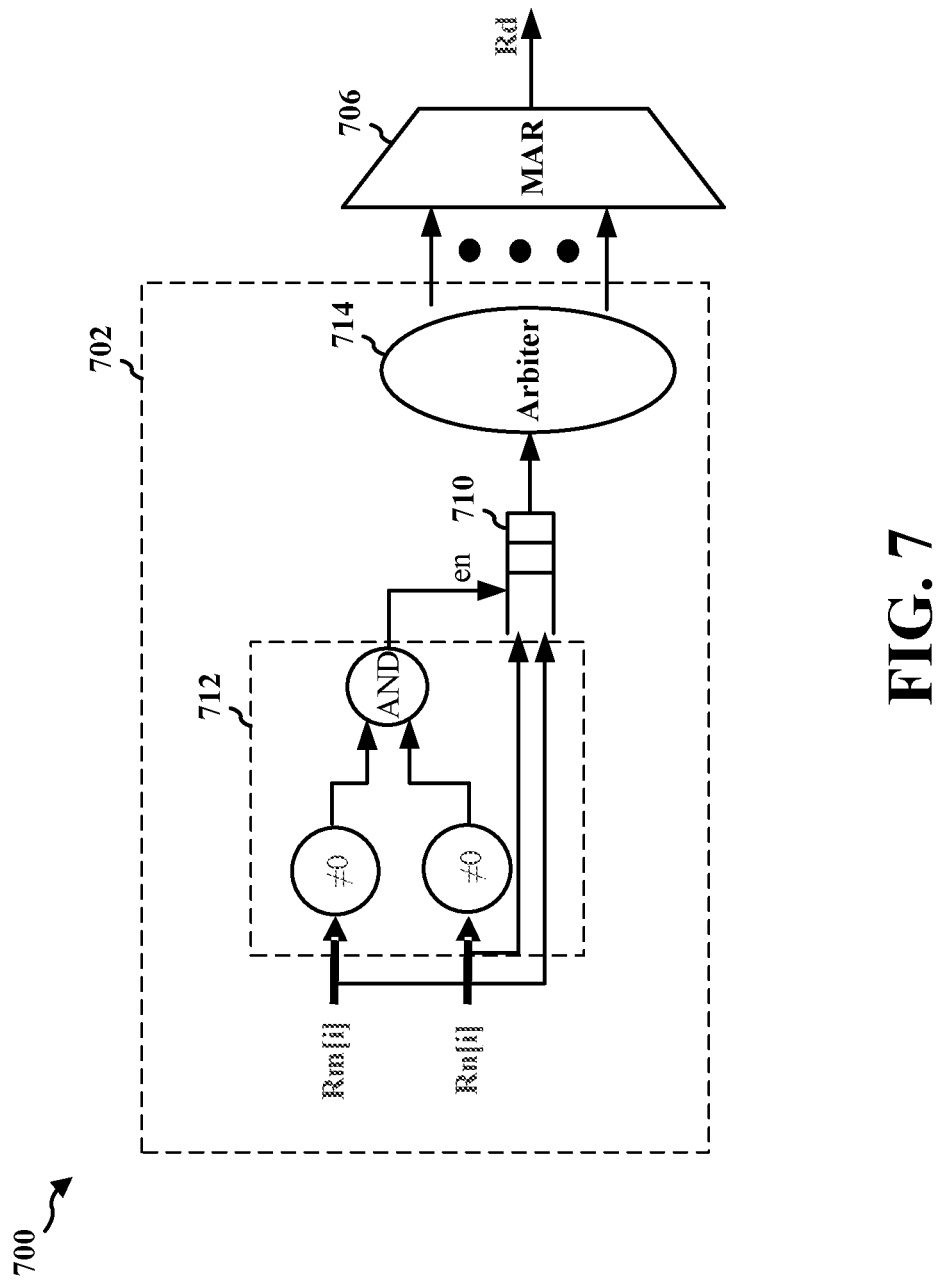
FIG. 7 is a diagram illustrating another example of a load unit that provides operands to a MAR unit.

FIG. 7 is a diagram 700 illustrating another example of a load unit 702 that provides operands to a MAR unit 706. In one configuration, the MAR unit 706 may be the MAR unit 400 described above with reference to FIG. 4, and the load unit 702 may be the load unit (e.g., 304a) described above with reference to FIG. 3. As illustrated, the load unit 702 may include a logic circuit 712, a queue 710, and an arbiter 714.

The logic circuit 712 may receive a pair of operands $R_m[i]$ and $R_n[i]$, and determine whether both $R_m[i]$ and $R_n[i]$ are non-zero. If bother $R_m[i]$ and $R_n[i]$ are non-zero, the queue 710 may be enabled to allow $R_m[i]$ and $R_n[i]$ to be placed into the queue 710. If at least one of $R_m[i]$ and $R_n[i]$ is zero, the queue 710 may be disabled, thus preventing $R_m[i]$ and $R_n[i]$ from being placed into the queue 710.

The arbiter 714 may select a pair of operands from the queue 710 and load the pair of operands to one multiplier of the MAR unit 706. In one configuration, the arbiter 714 may load the pair of operands to a multiplier of the MAR unit 706 (randomly or accordingly to a pre-determined order).

In one configuration, the load unit 702 may fetch the operands at a fetch frequency based on the sparsity of the neural network. For example, in one configuration, a neural network may have 50% sparsity in weights and 50% sparsity in activations. As a result, there may be one non-zero pair of operands for every four pairs of operands. In such a configuration, the load unit 702 may fetch pairs of operands at a frequency that is four times the frequency at which the MAR unit 706 performs computations, and schedule the non-zero pairs of operands on the MAR unit 706.

Figure 8:
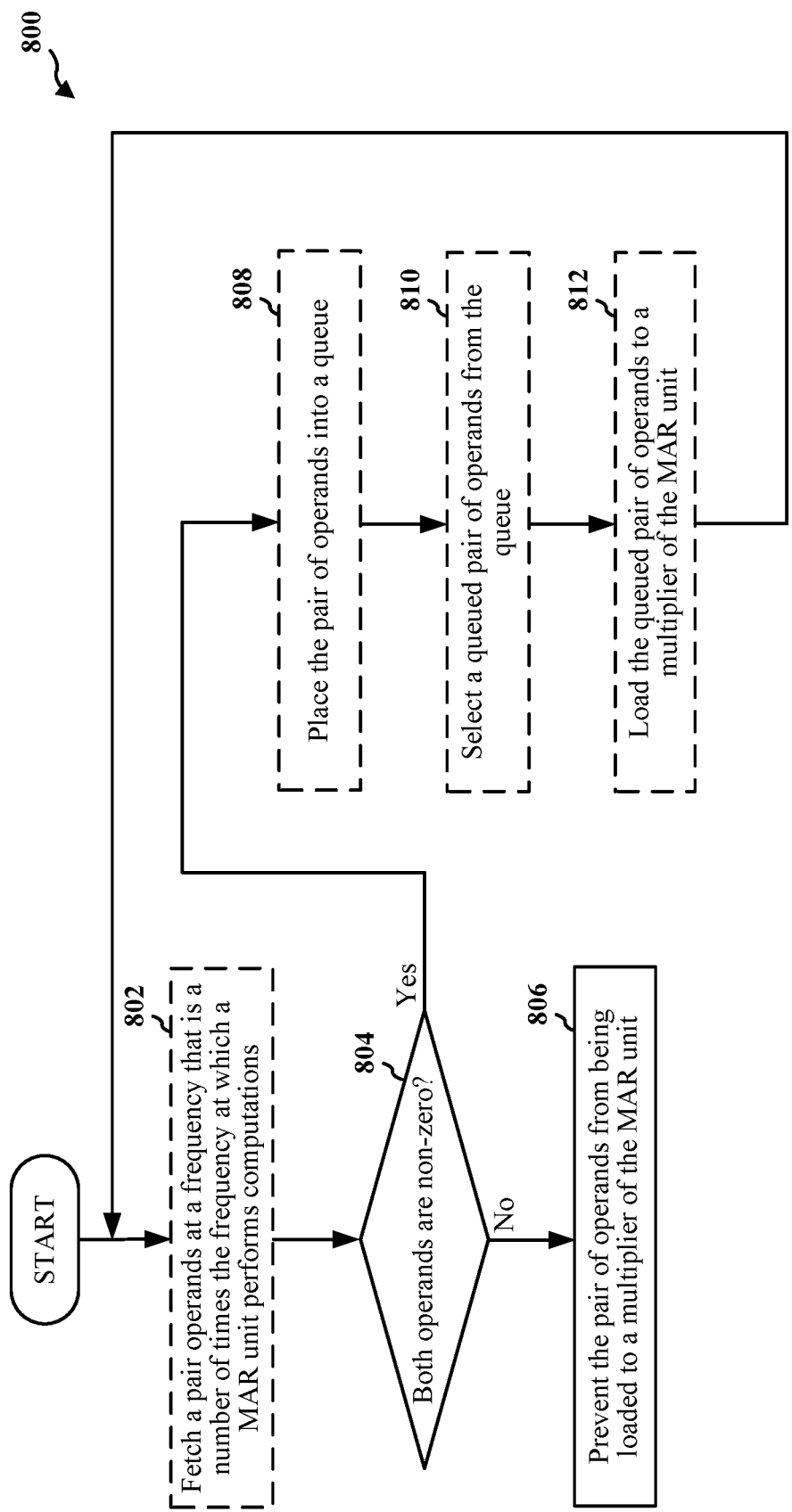
FIG. 8 is a flowchart of a method for a neural network.

FIG. 8 is a flowchart 800 of a method for a neural network. In one configuration, the neural network may be a deep convolutional neural network (DCN). The method may be performed by a computing device (e.g., the device 300 or the apparatus 902/902'). At 802, the device may optionally fetch a pair of operands at a frequency that is a number of times (e.g., 4-time) the frequency at which a MAR unit performs computations. In one configuration, a weight and an activation of the neural network may form a pair of operands that are to be loaded to a multiplier (e.g., the multiplier 402a) of the MAR unit (e.g., the MAR unit 400 or 706, which may be within a computation unit 314). In one configuration, the weight and activation may be stored in an operand storage (e.g., the operand storage 308). In one configuration, the MAR unit may include a plurality of multipliers and an adder.

At 804, the device may determine, for each fetched operand pair, whether both operands of the pair are non-zero. If both operands of a fetched operand pair are non-zero, the device may proceed to 808. If at least one of the operands of a fetched operand pair is zero, the device may proceed to 806. In one configuration, in order to determine whether an operand (e.g., a weight or an activation) is zero or not, the operand may be compared to a zero value.

At 806, the device may prevent a pair of operands from being loaded to a multiplier of the MAR unit if at least one operand of the pair of operands is zero. In one configuration, to prevent the pair of operands from being loaded to a multiplier of the MAR unit, the device may prevent the pair of operands from being placed into a queue (e.g., 710).

At 808, the device may optionally place a pair of operands into a queue (e.g., 710) if both operands of the pair are non-zero.

At 810, the device may optionally select a queued pair of operands from the queue.

At 812, the device may optionally load the queued pair of operands to a multiplier of the MAR unit. In one configuration, an arbiter may load the pair of operands to a random multiplier of the MAR unit. In one configuration, an arbiter may load the pair of operands to a multiplier of the MAR unit according to a pre-determined sequence.

Figure 9:
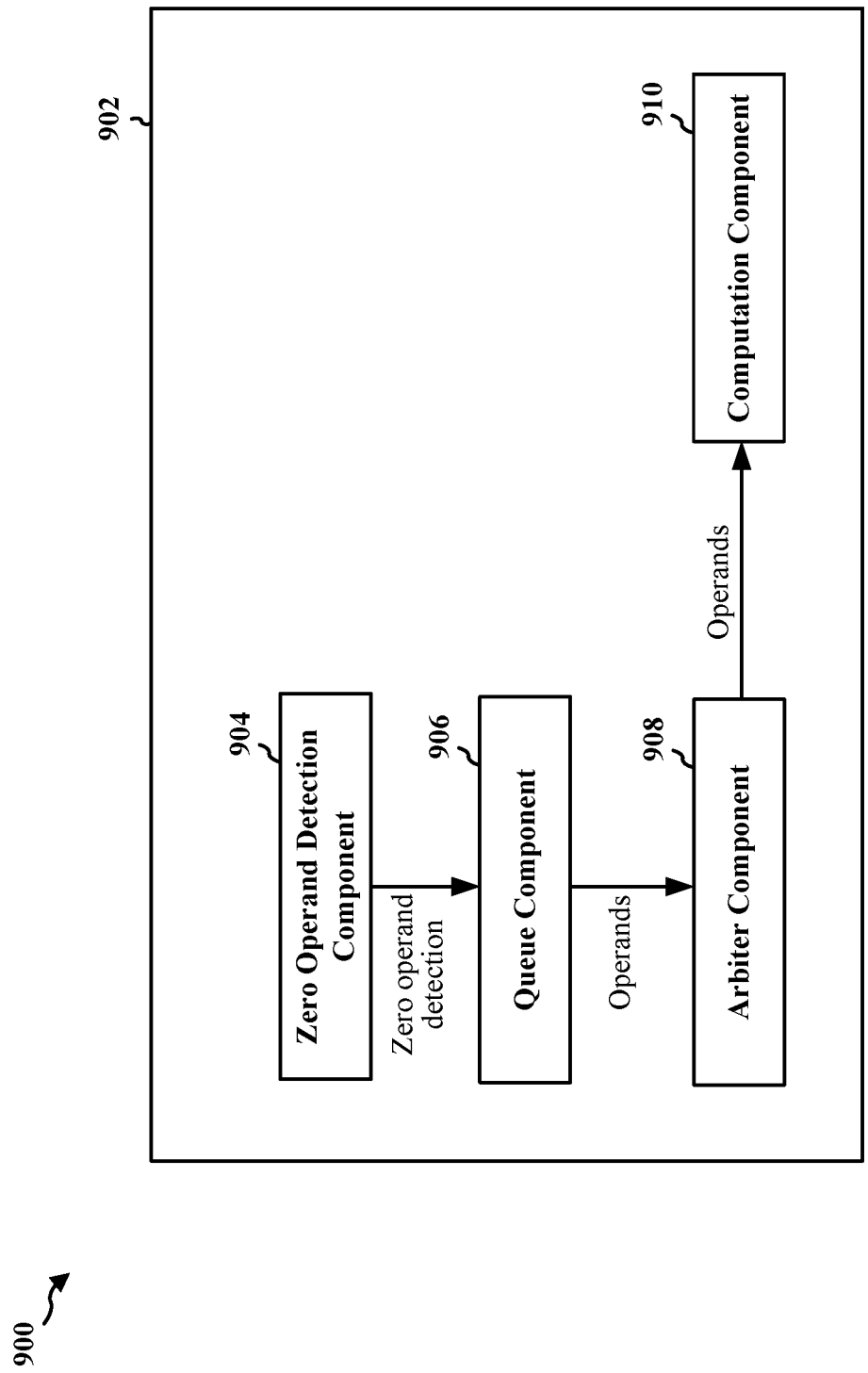
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus 902 may be a computing device (e.g., the device 300).

The apparatus 902 may include a zero operand detection component 904 that detects whether or not at least one operand of a pair of operands is zero. The pair of operands may include a weight of a neural network and an activation of the neural network. In one configuration, the zero operand detection component 904 may perform operations described above with reference to 604 in FIG. 6 or 804 in FIG. 8.

The apparatus 902 may include a computation component 910 that perform MAR operations. In one configuration, the computation component 910 may include the computation units 314 described above with reference to FIG. 3.

The apparatus 902 may include a queue component 906 that enables or disables placing a pair of operands into one or more queues based on the zero operand detection received from the zero operand detection component 904. In one configuration, the queue component 906 may include the queues 510 or the queue 710 described above. In one configuration, the queue component 906 may perform operations described above with reference to 606 or 608 in FIG. 6, or 806 or 808 in FIG. 8.

The apparatus 902 may include an arbiter component 908 that receives operands from the queue component 906 and loads the operands into the computation component 910. In one configuration, the arbiter component 908 may include the arbiter 514 or 714 described above. In one configuration, the arbiter component 908 may perform operations described above with reference to 610 or 612 in FIG. 6, or 810 or 812 in FIG. 8.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
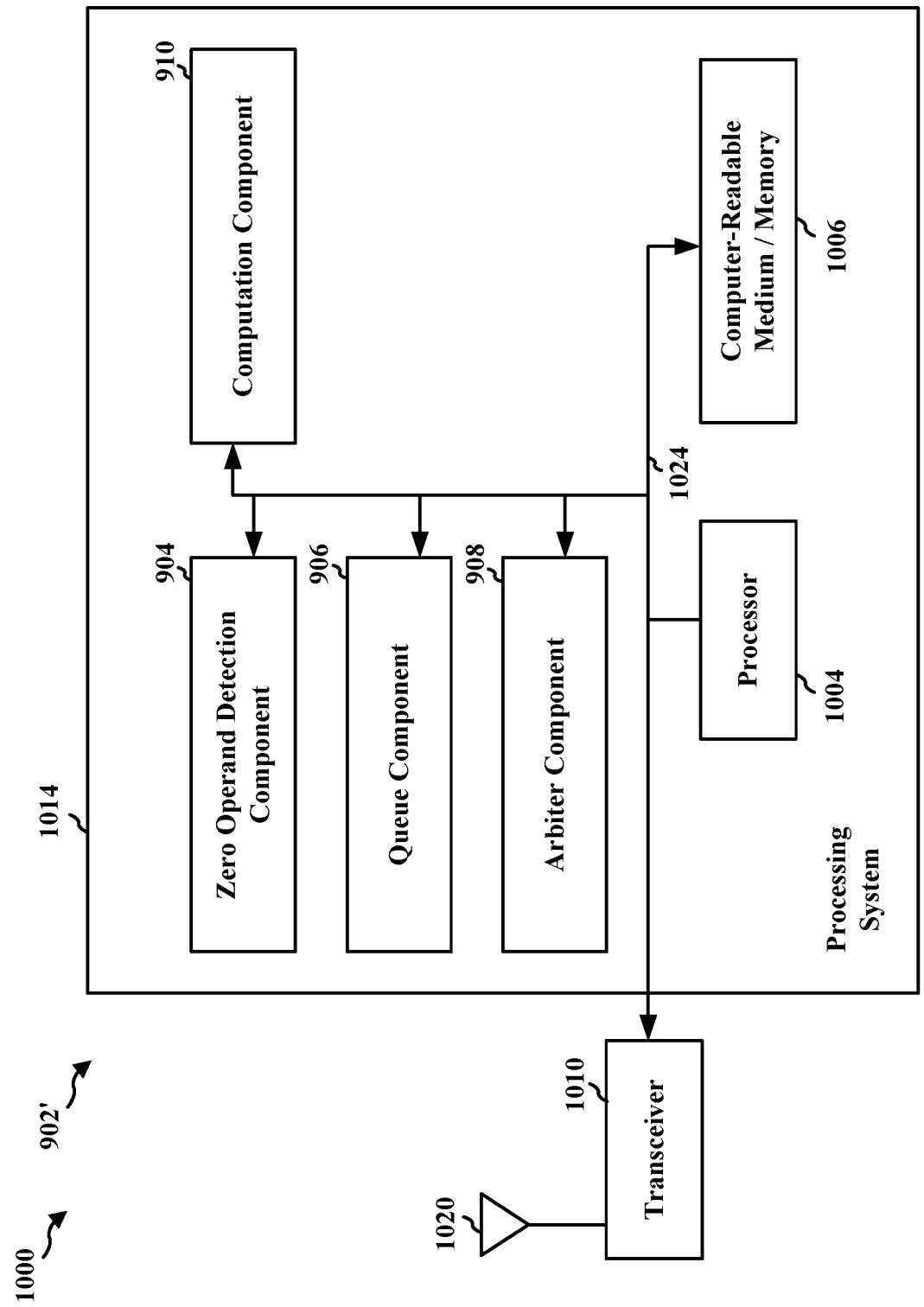
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 may be coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. In addition, the transceiver 1010 receives information from the processing system 1014, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof.

In one configuration, the apparatus 902/902' may include means for determining, for each pair of operands to be processed by a MAR unit, whether both operands of the pair are non-zero. In one configuration, the means for determining, for each pair of operands to be processed by a MAR unit, whether both operands of the pair are non-zero may perform operations described above with reference to 604 in FIG. 6 or 804 in FIG. 8. In one configuration, the means for determining, for each pair of operands to be processed by a MAR unit, whether both operands of the pair are non-zero may include the zero operand detection component 904 and/or the processor 1004.

In one configuration, the apparatus 902/902' may include means for preventing a pair of operands to be processed by the MAR unit from being loaded to a multiplier of the MAR unit when an operand of the pair of operands is zero. In one configuration, the means for preventing a pair of operands to be processed by the MAR unit from being loaded to a multiplier of the MAR unit may perform operations described above with reference to 606 in FIG. 6 or 806 in FIG. 8. In one configuration, the means for preventing a pair of operands to be processed by the MAR unit from being loaded to a multiplier of the MAR unit may include the load unit 304, the queue component 906, and/or the processor 1004.

In one configuration, the apparatus 902/902' may include means for placing the pair of operands into one of a plurality of queues when both operands of the pair of operands are non-zero. In one configuration, the means for placing the pair of operands into one of a plurality of queues may perform operations described above with reference to 608 in FIG. 6 or 808 in FIG. 8. In one configuration, the means for placing the pair of operands into one of a plurality of queues may include the load unit 304, the queue component 906, and/or the processor 1004.

In one configuration, the apparatus 902/902' may include means for selecting a queued pair of operands from one or more queues. In one configuration, the means for selecting a queued pair of operands from one or more queues may perform operations described above with reference to 610 in FIG. 6 or 810 in FIG. 8. In one configuration, the means for selecting a queued pair of operands from one or more queues may include the load unit 304, the arbiter component 908, and/or the processor 1004.

In one configuration, the apparatus 902/902' may include means for loading the queued pair of operands to a multiplier of the MAR unit. In one configuration, the means for loading the queued pair of operands to a multiplier of the MAR unit may perform operations described above with reference to 612 in FIG. 6 or 812 in FIG. 8. In one configuration, the means for loading the queued pair of operands to a multiplier of the MAR unit may include the load unit 304, the arbiter component 908, and/or the processor 1004.

In one configuration, the means for selecting and the means for loading may include an arbiter that randomly selects a pair of operands from the plurality of queues and loads the pair of operands to a multiplier of the MAR unit (randomly or according to a pre-determined sequence). In one configuration, the means for selecting and the means for loading may include an allocator that employs a set of heuristic rules to select a pair of operands from the plurality of queues and to load the pair of operands to a multipliers of the MAR unit (randomly or according to a pre-determined sequence).

In one configuration, the apparatus 902/902' may include means for synchronizing the plurality of queues after a particular number of MAR instructions. In one configuration, the means for synchronizing the plurality of queues after a particular number of MAR instructions may perform operations described above with reference to 614 or 616 in FIG. 6. In one configuration, the means for synchronizing the plurality of queues after a particular number of MAR instructions may include the load unit 304, the queue component 906, or the processor 1004. In one configuration, the means for synchronizing the plurality of queues may be configured to prevent placing new operands into the plurality of queues before each queue of the plurality of queues is empty.

The aforementioned means may be one or more of the aforementioned components of the apparatus 902 and/or the processing system 1014 of the apparatus 902' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for a deep convolutional neural network, comprising:
    determining, by a load unit, for a pair of operands fetched from an operand storage to be placed into one queue of a plurality of queues for processing by a multiply-accumulate-reduce (MAR) unit, whether both operands of the pair of operands are non-zero; and
    preventing, by the load unit, the pair of operands from being placed into the plurality of queues when an operand of the pair of operands is determined to be zero.

2. The method of claim 1, further comprising placing the pair of operands into the one queue of the plurality of queues when both operands of the pair of operands are determined to be non-zero.

3. The method of claim 2, wherein non-zero operand pairs are placed into the plurality of queues randomly or in a pre-determined order that repeats.

4. The method of claim 2, further comprising:
    selecting a queued pair of operands from the plurality of queues; and
    loading the queued pair of operands to a multiplier of the MAR unit.

5. The method of claim 4, wherein the selecting and the loading are performed by an arbiter that randomly selects the queued pair of operands from the plurality of queues and loads the queued pair of operands to the multiplier of the MAR unit.

6. The method of claim 4, wherein the selecting and the loading are performed by an allocator that employs a set of heuristic rules to select the queued pair of operands from the plurality of queues and to load the queued pair of operands to the multiplier of the MAR unit.

7. The method of claim 2, further comprising synchronizing the plurality of queues after a particular number of MAR instructions.

8. The method of claim 7, wherein the synchronizing the plurality of queues comprises preventing placing new operands into the plurality of queues before each queue of the plurality of queues is empty.

9. The method of claim 7, wherein the particular number is a fixed number or a variable number.

10. The method of claim 2, wherein the plurality of queues includes a certain number of queues, and wherein the certain number is determined based on a sparsity of the deep convolutional neural network.

11. The method of claim 1, wherein the preventing comprises disabling, by the load unit, the plurality of queues when the operand of the pair of operands is determined to be zero.

12. The method of claim 1, wherein each of the pair of operands correspond to a weight and an activation associated with the deep convolutional neural network.

13. The method of claim 1 further comprising:
    fetching, by the load unit, based at least on a sparsity of the deep convolutional neural network, the pair of operands at a rate that is one of 2 times, 4 times, and 8 times a count of operands that the MAR unit handles.

14. An apparatus for a deep convolutional neural network, comprising:
    means for determining, for a pair of operands fetched from an operand storage to be placed into one queue of a plurality of queues for processing by a multiply-accumulate-reduce (MAR) unit, whether both operands of the pair of operands are non-zero; and
    means for preventing the pair of operands from being placed into the plurality of queues when an operand of the pair of operands is determined to be zero.

15. The apparatus of claim 14, further comprising means for placing the pair of operands into the one queue of the plurality of queues when both operands of the pair of operands are determined to be non-zero.

16. The apparatus of claim 15, wherein non-zero operand pairs are placed into the plurality of queues randomly or in a pre-determined order that repeats.

17. The apparatus of claim 15, further comprising:
    means for selecting a queued pair of operands from the plurality of queues; and
    means for loading the queued pair of operands to a multiplier of the MAR unit.

18. The apparatus of claim 17, wherein the means for selecting and the means for loading comprise an arbiter that randomly selects the queued pair of operands from the plurality of queues and loads the queued pair of operands to the multiplier of the MAR unit.

19. The apparatus of claim 17, wherein the means for selecting and the means for loading comprise an allocator that employs a set of heuristic rules to select the queued pair of operands from the plurality of queues and to load the queued pair of operands to the multiplier of the MAR unit.

20. The apparatus of claim 15, further comprising means for synchronizing the plurality of queues after a particular number of MAR instructions.

21. The apparatus of claim 20, wherein the means for synchronizing the plurality of queues is configured to prevent placing new operands into the plurality of queues before each queue of the plurality of queues is empty.

22. The apparatus of claim 20, wherein the particular number is a fixed number or a variable number.

23. The apparatus of claim 15, wherein the plurality of queues includes a certain number of queues, and wherein the certain number is determined based on a sparsity of the deep convolutional neural network.

24. An apparatus for a deep convolutional neural network, comprising:
    a memory; and
    at least one processor coupled to the memory and configured to:
        determine, for a pair of operands fetched from an operand storage in the memory to be placed into one queue of a plurality of queues for processing by a multiply-accumulate-reduce (MAR) unit, whether both operands of the pair of operands are non-zero; and
        prevent the pair of operands from being placed into the plurality of queues when an operand of the pair of operands is determined to be zero.

25. The apparatus of claim 24, wherein the at least one processor is further configured to place the pair of operands into the one queue of the plurality of queues when both operands of the pair of operands are determined to be non-zero.

26. The apparatus of claim 25, wherein non-zero operand pairs are placed into the plurality of queues randomly or in a pre-determined order that repeats.

27. The apparatus of claim 25, wherein the at least one processor is further configured to:
   select a queued pair of operands from the plurality of queues; and
   load the queued pair of operands to a multiplier of the MAR unit.

28. The apparatus of claim 27, wherein the selecting and the loading are performed by an arbiter that randomly selects the queued pair of operands from the plurality of queues and loads the queued pair of operands to the multiplier of the MAR unit.

29. The apparatus of claim 22, wherein the at least one processor is further configured to synchronize the plurality of queues after a particular number of MAR instructions, and wherein, to synchronize the plurality of queues, the at least one processor is configured to prevent placing new operands into the plurality of queues before each queue of the plurality of queues is empty.

30. A non-transitory computer-readable medium storing computer executable code for a deep convolutional neural network, comprising code to:
   determine, for a pair of operands fetched from an operand storage to be placed into one queue of a plurality of queues for processing by a multiply-accumulate-reduce (MAR) unit, whether both operands of the pair of operands are non-zero; and
   prevent the pair of operands from being placed into the plurality of queues when an operand of the pair of operands is determined to be zero.

* * * * *